Sept. 6, 1932.  P. L. BUTTERFIELD  1,876,396
CONTINUOUS WEIGHING DEVICE
Filed Nov. 24, 1931  2 Sheets-Sheet 1
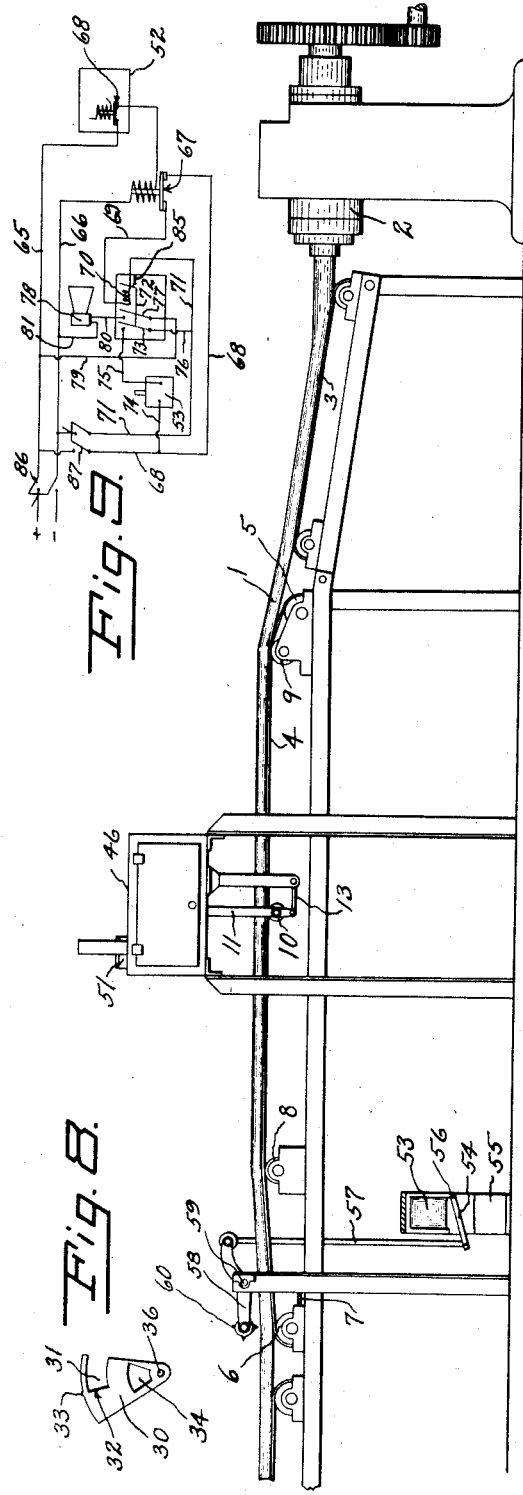
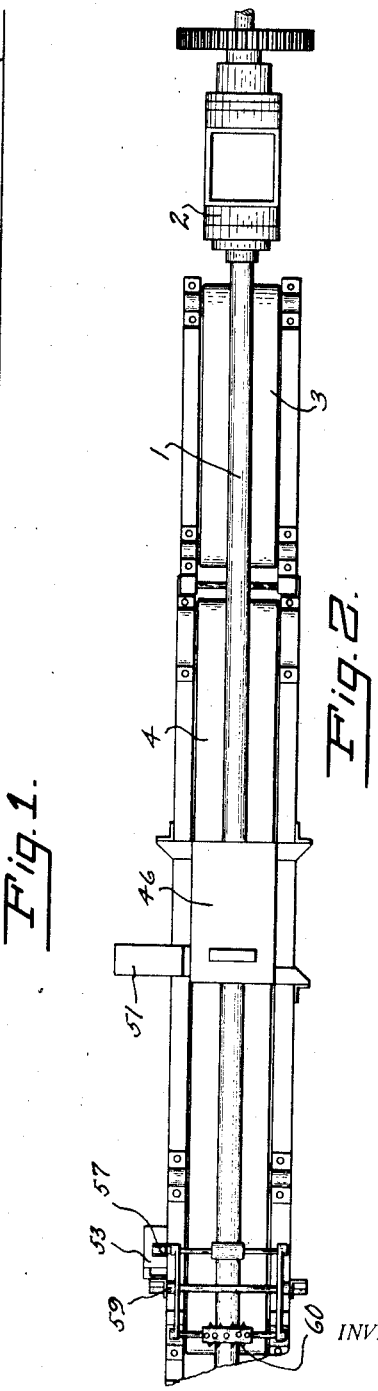
INVENTOR.
BY  PERCY L. BUTTERFIELD
*Chapin + Neal*
ATTORNEYS.

Sept. 6, 1932.    P. L. BUTTERFIELD    1,876,396
CONTINUOUS WEIGHING DEVICE
Filed Nov. 24, 1931    2 Sheets-Sheet 2
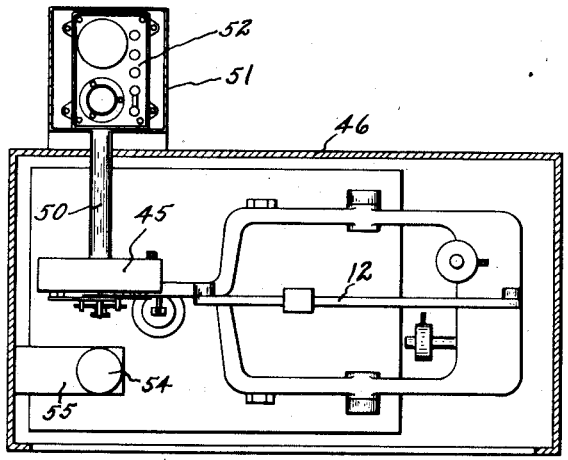
Fig.3.
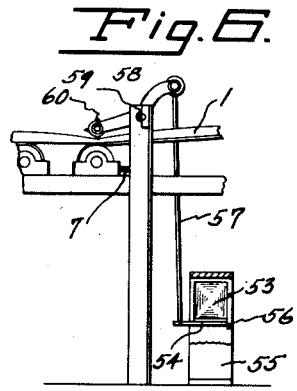
Fig.6.
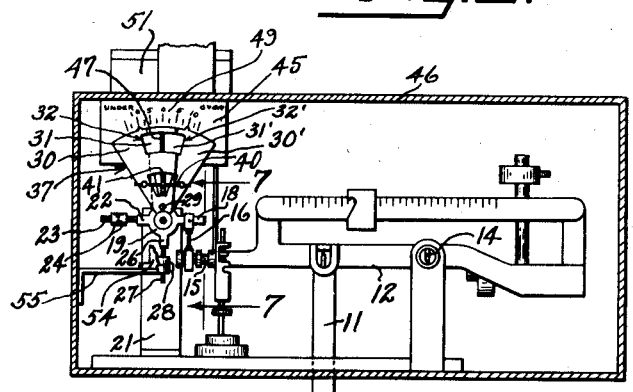
Fig.4.
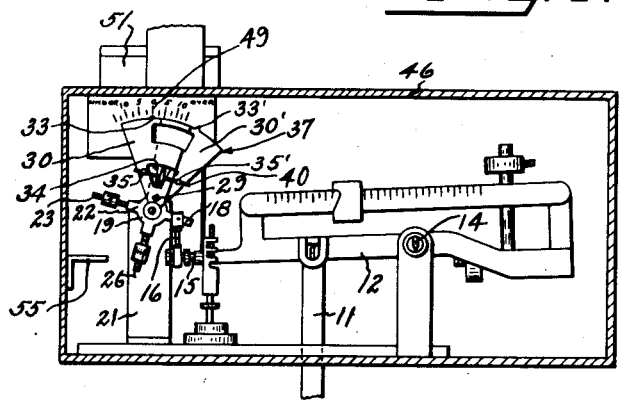
Fig.5.
Fig.7.
INVENTOR.
BY PERCY L. BUTTERFIELD
Chapin + Neal
ATTORNEYS.

Patented Sept. 6, 1932

1,876,396

UNITED STATES PATENT OFFICE

PERCY L. BUTTERFIELD, OF SPRINGFIELD, MASSACHUSETTS, ASSIGNOR TO ROLAND W. BOYDEN AND CHARLES A. DANA, AS RECEIVERS OF THE FISK RUBBER COMPANY, OF CHICOPEE FALLS, MASSACHUSETTS, A CORPORATION OF MASSACHUSETTS

CONTINUOUS WEIGHING DEVICE

Application filed November 24, 1931. Serial No. 577,003.

This invention relates to continuous weighing devices which include means for rendering unfit for use that portion of the weighed materal which is under or over a predetermined standard of weight. More particularly it relates to an improved control mechanism for the device which marks, or destroys, the rejected stock.

The principal object of the invention is to provide control mechanism, for this purpose, of increased sensitivity and such that its operation while automatically responsive to the movement of the scale beam does not impose any load on the latter in its operation. Other and further objects will be apparent from the following specification and claims.

In the accompanying drawings which illustrate one embodiment of my invention,

Fig. 1 is a side elevation of a weighing device, incorporating my invention, cooperating with an extruding machine;

Fig. 2 is a plan view of the apparatus shown in Fig. 1;

Fig. 3 is a plan view of the control device on a larger scale;

Fig. 4 is a side elevation of the structure shown in Fig. 3, the scale being balanced;

Fig. 5 is a view similar to that of Fig. 4 but showing an unbalanced position of the scales;

Fig. 6 is a detail view of the stock destroyer in operative position;

Fig. 7 is a section taken substantially on line 7—7 of Fig. 4 but on a larger scale;

Fig. 8 is a detail view of one of the shutter elements; and

Fig. 9 is a wiring diagram.

As shown, the invention is applied to a weighing scale for continuously weighing rubber tubing as it comes from an extruding machine but it will be understood that it is not limited to such use. As shown, the extruded tubing 1 passes from the extruding machine 2 onto an inclined belt conveyor 3 which delivers it to a belt conveyor 4 stretched tightly between a fixed pulley 5 and a pulley 6, the latter being provided with a suitable belt tightening device indicated at 7. Supporting rolls 8 and 9 are positioned intermediate pulleys 5 and 6 and midway between rolls 8 and 9 the conveyor belt 4 rests on a roll 10 suspended by a link 11 from the scale beam 12. A linkage 13 is provided to prevent swaying of the roll 10. The detail of the scale mechanism forms no part of my invention and is not therefore described in detail. The scale beam 12, which is pivoted at 14, is provided with an extension 15 connected to one end of a link 16, the opposite end of which is pivotally connected as by a U-shaped member 17 to one arm 18 of a rocker 19 journaled on a stub shaft 20 secured to a support 21. Rocker 19 is provided with a second arm 22, positioned diametrically opposite arc 18, which is threaded as at 23 to receive weights 24 by means of which linkage 16 may be exactly counterbalanced. Rocker 19 is also provided with oppositely extending radial arms 25 and 26 positioned at right angles to arms 18 and 22. Arm 25 is adapted to carry a shutter mechanism, hereafter described, while arm 26 is threaded as at 27 to receive weight 28 by which the shutter may be exactly counterbalanced.

The shutter mechanism, generally indicated at 37, comprises two elements 30 and 30' pivoted to supporting arm 25 at 29. The detail structure of shutter element 30 is shown in Fig. 8 and as will be obvious from Figs. 4 and 5, element 30' is exactly similar except that it is reversed, similar parts of the elements being indicated by primed reference characters. Referring to Fig. 8, each shutter element is generally segmental in shape and is provided with an opening or notch 31, the inner edge 32 of which is preferably so positioned as to lie on a radius passing through the center of stub shaft 20 when the elements are mounted on arm 25. Preferably the outer arcuate edge of the element is provided with a pointer 33, radially in line with the edge 32. An opening 34 is formed in the element to receive an adjusting screw, later described, and which is adapted to pass through a threaded lug 35 suitably swiveled to the shutter element adjacent opening 34. An aperture 36 is provided to receive the bolt 29 by which the elements are secured to arm 25. As will be clear from Figs. 4 and 5, the elements 30 and 30' are mounted fanwise on the arm 25 in overlapping relation, the notches 31 and 31' forming an opening the arcuate extent of which varies with the degree of overlap of the elements. The degree of overlap is nicely adjusted by means of a screw 40 the ends of which are oppositely threaded and engage in lugs 35 and 35' respectively. A milled wheel 41 is secured at the center of screw 40 by means of which adjustment of the shutter opening may be effected, the rear edge of wheel 41 engaging in a groove or slot 42 (see Fig. 7) formed in arm 25 to hold the screw centered with respect to the arm. When the size of the shutter opening has been properly adjusted by means of screw 40 the elements may be clamped in adjusted position by tightening bolt 29 by which the elements are held to arm 25.

The shutter is positioned to swing closely adjacent a plate 45 depending from the top of the scale housing 46. Plate 45 is provided with a vertical slit 47 positioned in radial alignment with the axis of stub shaft 20 about which the shutter swings, said slit being therefore positioned centrally of the shutter opening when the scale beam is balanced. Plate 45 is provided with graduations 49 which cooperate with pointers 33—33' in a manner later described.

Slit 47 opens centrally of a tube 50 one end of which is connected to the rear face of plate 45, the other end opening into a box 51 which contains a conventional photo-electric cell amplifier unit 52. This unit being of conventional construction is not described in detail.

A source of light such as an ordinary electric bulb 54 is mounted on a bracket 55 in front of the shutter 37 in alignment with slit 47 and tube 50 so that as long as the rocking of the shutter in either direction, due to movement of the scale beam, is confined within the extent of the shutter opening a ray of light passes to and actuates the unit 52, but when such rocking movement exceeds the limits defined by the edges 32 and 32' of the shutter opening (conveniently indicated on scale 49 by pointers 33 and 33') the ray of light passing to the photo-electric unit is interrupted.

This occurs automatically when the movement of the scale beam 12 in response to an over or under weight of material passing over roll 10 is in excess of the tolerances predetermined by the degree of overlap of the shutter elements. Unit 52 forms one element of an electric circuit presently to be described, which controls a solenoid 53 (see Figs. 1 and 6) the armature 54 of which is pivoted at one end to the solenoid support 55 as at 56, the other end of the armature being connected by a link 57 to a frame 58 pivoted to the conveyor frame at 59 and carrying a spiked roller 60. Roll 60 is normally held in inoperative position by the weight of link 57 or suitable counterweights. As will be clear from Figs. 1 and 6, actuation of solenoid 53 through interruption of the light beam by the shutter 37 swings spiked roller 60 downward into destroying contact with the stock 1 passing along the conveyor.

The electric circuit employed is shown diagrammatically in Fig. 9 where 65 and 66 represent the main leads from a source of electric current, not shown, to the solenoid of a magnetic switch or relay 67. Positioned in line 65 is the magnetic switch or relay 68 forming part of the unit 52 and which is closed when the light to unit 52 is interrupted, thus closing switch 67. Closing of switch 67 closes the circuit through branch 68 of line 65, switch 67, line 69, solenoid 70 and branch 71 to main lead 66. Solenoid 70 operates to close a double pole switch 72, normally held open by gravity or a spring 85, pole 73 of switch 72 closing the circuit from main lead 65 through branch 68, line 74, solenoid 53, line 75, switch 73, line 76 and branch 71 to main lead 66. Actuation of solenoid 53 causes spiked roll to engage and destroy the stock as previously described. Simultaneously with the actuation of solenoid 53, by the closing of its circuit by pole 73 of switch 72, pole 77 of said switch closes a circuit through an electric horn 78, this circuit being traced through 79, switch pole 77, lead 80, horn 78 and lead 81. The operator is thus advised that the stock destroyer has been placed in operation. As soon as the condition of over or under weight of the stock has been remedied shutter 37 will, of course, swing into position to permit light from lamp 54 to again enter unit 52, operating relay 68, to again break the circuit through relay 67 which breaks the circuit through solenoid 70 permitting spring 85 to open the switch 72, thus de-energizing solenoid 53, permitting roll 60 to rise, and silencing horn 78.

Switches 86 and 87 are preferably provided to permit opening of the various circuits while adjustments of the shutter or other parts of the device are being made.

It will be seen that by my arrangement the stock destroyer is automatically operated in response to an under or over weight of the stock and that this actuation is effected without placing any additional load on the beam of the scale since the shutter is nicely balanced in its movements and no physical contact is necessary to effect the actuation. Furthermore, the adjustment of the shutter opening permits a nice control of the permitted tolerance.

Having thus described my invention, I claim:

1. In combination means for forming stock in continuous lengths, means for determining the weight of said stock per unit of length, stock marring means and means associated with the weighing means for balanced movement therewith to automatically actuate said stock marring means to indicate such portions of the stock as are outside predetermined weight limits.

2. In combination with the scale beam of a continuous weighing device, a shutter device, means operatively connecting the shutter to the scale beam, a photo-electric unit adapted to be actuated by the shutter in response to an excessive movement of the scale beam in either direction, and means controlled by the photo-electric unit for marring the material being weighed upon such excessive movement of the scale beam.

3. In combination with the scale beam of a continuous weighing device, a pivoted shutter member having an arcuately elongated opening, means connecting said shutter to the scale beam to cause the shutter to partake of the swinging movement of the beam, a photo-electric unit and a source of light positioned on opposite sides of the shutter, the shutter opening being in line with the light source and the photo-electric unit when the scale beam is in balanced position, and means actuated by the photo-electric unit to mar the material being weighed when the light passing through the shutter opening is interrupted in response to an excessive movement of the scale beam in either direction.

4. In combination with the scale beam of a continuous weighing device, a pivoted shutter member having an arcuately elongated opening, means connecting said shutter to the scale beam to cause the shutter to partake of the swinging movement of the beam, means to balance the shutter and means to balance said connecting means, a photo-electric unit and a source of light positioned on opposite sides of the shutter, the shutter opening being in line with the light source and the photo-electric unit when the scale beam is in balanced position, and means actuated by the photo-electric unit to mar the material being weighed when the light passing through the shutter opening is interrupted in response to an excessive movement of the scale beam in either direction.

5. In combination with the scale beam of a continuous weighing device, a pivoted shutter member having an arcuately elongated opening, means for adjusting the arcuate length of said opening, means connecting said shutter to the scale beam to cause the shutter to partake of the swinging movement of the beam, a photo-electric unit and a source of light positioned on opposite sides of the shutter, the shutter opening being in line with the light source and the photo-electric unit when the scale beam is in balanced position, and means actuated by the photo-electric unit to mar the material being weighed when the light passing through the shutter opening is interrupted in response to an excessive movement of the scale beam in either direction.

6. In combination with the scale beam of a continuous weighing device, a pivoted shutter member having an arcuately elongated opening, means for adjusting the arcuate length of said opening, means connecting said shutter to the scale beam to cause the shutter to partake of the swinging movement of the beam, means to balance the shutter and means to balance said connecting means, a photo-electric unit and a source of light positioned on opposite sides of the shutter, the shutter opening being in line with the light source and the photo-electric unit when the scale beam is in balanced position, and means actuated by the photo-electric unit to mar the material being weighed when the light passing through the shutter opening is interrupted in response to an excessive movement of the scale beam in either direction.

7. A device for automatically destroying stock which departs from predetermined tolerances of weight which comprises, weighing mechanism for continuously weighing the stock, a pivoted frame, a spiked roll carried by said frame, and means for pressing the roll against the stock by the operation of the weighing mechanism in departing from said tolerances.

In testimony whereof I have affixed my signature.

PERCY L. BUTTERFIELD.